US010052638B2

(12) United States Patent
Park et al.

(10) Patent No.: US 10,052,638 B2
(45) Date of Patent: Aug. 21, 2018

(54) SORTING METHOD AND APPARATUS FOR RECYCLING FILLER INCLUDED IN ARTIFICIAL TURF

(71) Applicants: KOLON GLOTECH, INC., Gwacheon (KR); SUNGWON RECYCLE CO., LTD., Gyeongsan (KR)

(72) Inventors: Keon Su Park, Daegu (KR); Young Hoon Kwon, Gumi (KR); Kwang Su Cho, Gumi (KR); Kyoung Rok Kong, Gimhae (KR); Ji Young Jang, Cheongdo-gun (KR)

(73) Assignees: KOLONGLOTECH, INC, Gwacheon-si (KR); SUNGWON RECYCLE CO., LTD., Gyeongsan-si (KR)

( * ) Notice: Subject to any disclaimer, the term of this patent is extended or adjusted under 35 U.S.C. 154(b) by 0 days.

(21) Appl. No.: 15/376,502

(22) Filed: Dec. 12, 2016

(65) Prior Publication Data

US 2017/0087560 A1     Mar. 30, 2017

Related U.S. Application Data

(62) Division of application No. 14/388,942, filed as application No. PCT/KR2014/002669 on Mar. 28, 2014, now Pat. No. 9,789,491.

(30) Foreign Application Priority Data

Mar. 28, 2013   (KR) .................. 10-2013-0033547
Mar. 28, 2013   (KR) .................. 10-2013-0033737
(Continued)

(51) Int. Cl.
*B03B 9/00*   (2006.01)
*B03B 5/04*   (2006.01)
(Continued)

(52) U.S. Cl.
CPC ............. *B03B 9/00* (2013.01); *B03B 5/04* (2013.01); *B03B 5/06* (2013.01); *B03B 5/32* (2013.01);
(Continued)

(58) Field of Classification Search
CPC .... B03B 5/04; B03B 5/06; B03B 5/32; B03B 5/40; B03B 5/626; B03B 9/00
(Continued)

(56) References Cited

U.S. PATENT DOCUMENTS 2,068,783 A * 1/1937 Wendell .................. B03B 4/005
                                                     209/379
3,746,164 A * 7/1973 Culp ......................... B03B 7/00
                                                     209/234
(Continued)

FOREIGN PATENT DOCUMENTS

CN    102794289 A      11/2012
EP     0635307 A1 *    1/1995 .............. B03B 4/02
(Continued)

OTHER PUBLICATIONS

Jose Leiro et al, "Expression profiles of genes involved in the mouse nuclear factor-kappa B signal transduction pathway are modulated by mangiferin", International Immunopharmacology, 2004, pp. 763-778, vol. 4, Elsevier B. V.
(Continued)

*Primary Examiner* — Terrell H Matthews

(57) ABSTRACT

A method of recycling a filler included in artificial turf by sorting the filler into two or more materials, including: a first sorting operation of sorting the two or more materials based on a grain size; and a second sorting operation of sorting the materials, which are sorted by the first sorting operation and have grain sizes belonging to a predetermined range, based on specific gravity.

17 Claims, 8 Drawing Sheets

(30) Foreign Application Priority Data

| | | |
|---|---|---|
| May 9, 2013 | (KR) | 10-2013-0052725 |
| May 9, 2013 | (KR) | 10-2013-0052726 |
| Nov. 14, 2013 | (KR) | 10-2013-0138112 |
| Nov. 14, 2013 | (KR) | 10-2013-0138117 |

(51) Int. Cl.
| | |
|---|---|
| B07B 1/22 | (2006.01) |
| B29B 17/02 | (2006.01) |
| B03B 5/06 | (2006.01) |
| B03B 5/62 | (2006.01) |
| B03B 5/32 | (2006.01) |
| B03B 5/40 | (2006.01) |
| B03B 11/00 | (2006.01) |
| B03B 9/06 | (2006.01) |
| B29L 31/00 | (2006.01) |

(52) U.S. Cl.
CPC ........... *B03B 5/40* (2013.01); *B03B 5/623* (2013.01); *B03B 5/626* (2013.01); *B03B 9/061* (2013.01); *B03B 11/00* (2013.01); *B07B 1/22* (2013.01); *B29B 17/02* (2013.01); *B03B 2009/067* (2013.01); *B29B 2017/0224* (2013.01); *B29L 2031/732* (2013.01); *Y02W 30/523* (2015.05); *Y02W 30/524* (2015.05); *Y02W 30/622* (2015.05); *Y02W 30/667* (2015.05)

(58) Field of Classification Search
USPC ........................................................ 209/12.1
See application file for complete search history.

(56) References Cited

U.S. PATENT DOCUMENTS

| | | | | |
|---|---|---|---|---|
| 5,462,172 | A * | 10/1995 | Kumagai | B03B 4/02 209/12.1 |
| 7,503,513 | B2 * | 3/2009 | Simon | B03B 9/061 241/19 |
| 8,113,354 | B2 * | 2/2012 | Toida | B03B 5/28 209/157 |
| 2008/0135461 | A1* | 6/2008 | Olivier | B03B 5/28 209/162 |
| 2014/0262968 | A1* | 9/2014 | Fritz | C22B 7/04 209/12.1 |
| 2015/0108041 | A1* | 4/2015 | Andersen | B07B 9/02 209/3.1 |

FOREIGN PATENT DOCUMENTS

| | | | |
|---|---|---|---|
| EP | 2186942 | A1 | 5/2010 |
| JP | H06-170275 | A | 6/1994 |
| JP | H11-253889 | A | 9/1999 |
| JP | 2000-127169 | A | 5/2000 |
| JP | 2001-009319 | A | 1/2001 |
| JP | 2002-011376 | A | 1/2002 |
| JP | 2004-255312 | A | 9/2004 |
| JP | 2005-028290 | A | 2/2005 |
| JP | 2005-248493 | A | 9/2005 |
| JP | 2009-208033 | A | 9/2009 |
| JP | 2011235245 | A * | 11/2011 |
| JP | 2012-139636 | A | 7/2012 |
| KR | 10-2000-0058670 | A | 10/2000 |
| KR | 2000-0058670 | A | 10/2000 |
| KR | 2003-0063758 | A | 7/2003 |
| KR | 10-2005-0055362 | A | 6/2005 |
| KR | 10-2008-0058076 | A | 6/2006 |
| KR | 10-0870648 | B1 | 11/2008 |
| KR | 10-0959838 | B1 | 5/2010 |
| KR | 10-2010-0138730 | A | 12/2010 |
| KR | 20100138730 | A * | 12/2010 |
| KR | 10-2011-0077796 | A | 7/2011 |
| KR | 10-1175234 | B1 | 8/2012 |
| WO | WO 2009/022447 | A1 | 2/2009 |

OTHER PUBLICATIONS

Ning Li et al, "Berberine attenuates pro-inflammatory cytokine-induced tight junction disruption in an in vitro model of intestinal epithelial cells", European Journal of Pharmaceutical Sciences, 2010, pp. 1-8, vol. 40, Elsevier B. V.

Toshihiro Miura et al., "Antidiabetic activity of a xanthone compound, mangiferin", Phytomedicine, 2001, pp. 85-87, vol. 8(2), Urban & Fischer Verlag.

Talita Cavalcante Morais et al., "Mangiferin, a natural xanthone, accelerates gastrointestinal transit in mice involving cholinergic mechanism", World Journal of Gastroenterology, Jul. 7, 2012, pp. 3207-3214, vol. 18(25), Baishideng.

Yungwui Tjong et al, "Analgesic effect of Coptis chinensis rhizomes (Coptidis Rhizoma) extract on rat model of irritable bowels syndrome", Journal of Ethnopharmacology, 2011, pp. 754-761, vol. 135, Elsevier Ireland Ltd.

Se-Eun Jang et al, "Anticolitic Effect of the Rhizome Mixture of Anemarrhena asphodeloides and Coptidis chinensis (AC-mix) in Mice", Biomolecules & Therapeutics, 2013, pp. 398-404, vol. 21(5), The Korean Society of Applied Pharmacology.

* cited by examiner

SORTING METHOD AND APPARATUS FOR RECYCLING FILLER INCLUDED IN ARTIFICIAL TURF

The present invention is a divisional of and claims priority to U.S. application Ser. No. 14/388,942 filed Sep. 29, 2014, which is U.S. National Stage of International Patent Application No. PCT/KR2014/002669 filed Mar. 28, 2014, which claims priority to and the benefit of Korean Patent Application Nos. 10-2013-0138112 filed Nov. 14, 2013, 10-2013-0138117 filed Nov. 14, 2013, 10-2013-0052726 filed May 9, 2013, 10-2013-0052725 filed May 9, 2013, 10-2013-0033737 filed Mar. 28, 2013, 10-2013-0033547 filed Mar. 28, 2013 in the Korean Intellectual Property Office, the entire contents of which are incorporated herein by reference.

TECHNICAL FIELD

The present invention relates to a sorting method and a sorting apparatus for recycling a filler included in artificial turf, and more particularly, to a sorting method and a sorting apparatus for recycling a filler included in artificial turf, which are capable of separating two or more materials with high purity while recycling a filler included in artificial turf.

BACKGROUND ART

In general, artificial turf is artificially formed so as to have the form of turf made of synthetic fiber, and is easily managed after construction and retains green color, so that the artificial turf is used in a soccer field, a field hockey field, various indoor interiors, and leisure facilities.

Further, the artificial turf retains its excellent quality due to the recent development in technology, while saving water and protecting the environment, instead of using, and management cost of the artificial turf is reduced, so that a size of a market of the artificial turf has rapidly increased every year.

As illustrated in FIG. 1, the artificial turf includes a base 10 formed like a carpet, a turf layer 20 implanted on the base 10, and a filler 30 filled in the turf layer 20.

Here, the base 10 and the turf layer 20 are manufactured by using thermoplastic chemical fiber (for example, PE, PP, and nylon) as a fiber structure body, and the filler 30 includes particle silica sand 31, and an elastic body (for example, SBR, EPDM, and SEBS) 33, such as rubber or silicon particles, and may further include a backing surface (for example, PP, PET, SBR, NR, Acrylic, $CaCO_3$, and pigment, not illustrated) for fixing the turf layer to the base 10 according to a product.

However, when about 7 to 8 years elapse after the construction, the life span of the artificial turf expires due to abrasion of the turf layer 20 and the like, so that the artificial turf needs to be inevitably replaced.

Accordingly, when the artificial turf is replaced, the artificial turf having the expired life cannot be simply destroyed, but is recycled due to preventing a reason of environment pollution, waste of resources, and equipment, and in connection with this, the separation of the base 10 formed of thermoplastic chemical fiber, the turf layer 20, and the filler 30 from each other is published, and thus is not difficult.

However, the filler 30 formed of silica sand 31, the elastic body 33, and the like, even though grain sizes of the two or more materials forming the filler 30 are different from each other, the two or more materials are particles, so that it is not easy to separate the materials 30, and the filler 30 is processed by incinerating the total amount of filler, thereby causing contamination to the environment and wasting precious resources.

Accordingly, it is necessary to research and develop a sorting method and a sorting apparatus for recycling the filler 30, and further, even though the two or more materials (for example, the aforementioned silica sand 31 and elastic body 33) configuring the filler 30 are easily separated, it is impossible to recycle the filler 30 unless the two or more materials are separated from each other with high purity, so that it is necessary to research and develop a sorting method and a sorting apparatus for recycling the filler capable of securing even high purity.

DISCLOSURE

Technical Problem

According to necessity of research and development mentioned in the background art, a technical object of the present invention provides a sorting method and a sorting apparatus for recycling a filler included in artificial turf capable of separating two or more materials with high purity when recycling the filler included in the artificial turf.

A technical object to be achieved in the present invention is not limited to the aforementioned technical objects, and another not-mentioned technical object will be obviously understood by those skilled in the art from the description below.

Technical Solution

A technical solution for solving the technical problem of the present invention is to provide a method of recycling a filler included in artificial turf by sorting the filler into two or more materials, including: a first sorting operation of sorting the two or more materials based on a grain size; and a second sorting operation of sorting the materials, which are sorted by the first sorting operation and have grain sizes belonging to a predetermined range, based on specific gravity.

Here, the second sorting operation may include sorting the materials, which are sorted by the first sorting operation and have grain sizes belonging to a predetermined range, by using centrifugal force or specific gravity difference.

Further, the method of recycling the filler included in the artificial turf by sorting the filler into the two or more materials may further include a third sorting operation of sorting the materials, which are sorted by the first sorting operation or the second sorting operation and have grain sizes belonging to a predetermined range, based on specific gravity again.

Further, the third sorting operation may include sorting the materials, which are sorted by the first sorting operation or the second sorting operation and have the grain sizes belonging to the predetermined range, by using vibration.

In the meantime, the first sorting operation may be an operation of sorting the material having a predetermined grain size or greater by performing sieve-separation.

Further, the second sorting operation may include: making the materials, which are sorted by the first sorting operation and have grain sizes belonging to a predetermined range, flow into a predetermined housing; providing the centrifugal force into the housing; and providing predetermined first pressure water in a direction corresponding to a center axis of the centrifugal force.

In addition, the second sorting operation may further include separating the materials flowing into the housing by the centrifugal force based on the specific gravity difference, in which a first material having a relatively smaller specific gravity may float in the first pressure water to be discharged to an upper side of the housing, and a second material having a relatively greater specific gravity may be discharged to a lower side of the housing by a pressure of the first pressure water.

Further, the second sorting operation may be performed by a spiral classifier having a predetermined slope, in which a first material having a relatively smaller specific gravity may be sorted at a low slope position based on a center point by the spiral classifier, and a second material having a relatively greater specific gravity may be sorted at a high slope position based on the center point by the spiral classifier.

Further, the second sorting operation may be performed by a cyclone device including an accommodating unit for accommodating the materials, which are sorted by the first sorting operation and have grain sizes belonging to a predetermined range, in which a first material having a relatively smaller specific gravity may be sorted at a close position based on a center point of the accommodating unit, and a second material having a relatively greater specific gravity may be sorted at a distant position based on the center point of the accommodating unit.

In the meantime, the third sorting operation may include providing the materials, which are sorted by the first sorting operation or the second sorting operation and have the grain sizes belonging to the predetermined range, to a table having a slope based on any one axis among x, y, and z axes and generating vibration in a predetermined progress direction through a filler supply unit provided at one side of the table.

In this case, at least two axes among the x, y, and z axes of the table may be inclined at predetermined angles so as to provide a slope based on at least one axis among the x, y, and z axes, and the table may reciprocate at least one axis among the x, y, and z axes so as to generate the vibration in the predetermined progress direction.

Further, in the table, at least two axes among the x, y, and z axes inclined at the predetermined angles may have slopes of 0.1 to 20°.

In addition, the table may reciprocate at a speed of 100 rpm to 800 rpm.

Further, the table may include one or more guide bars provided in a direction parallel to a reference axis of the reciprocation to guide a movement of the material having a greater specific gravity among the materials, which are sorted by the first sorting operation or the second sorting operation and have the grain sizes belonging to the predetermined range.

In the meantime, the third sorting operation may further include providing second pressure water having a predetermined pressure through a second pressure water supply unit provided at the other side of the table different from one side of the table at which the filler supply unit is positioned.

In this case, the second pressure water may be provided in multiple, and may have different pressure sizes or be provided in a different direction.

The third sorting operation further includes sorting and collecting the materials, which are sorted by the first sorting operation or the second sorting operation and have grain sizes belonging to the predetermined range, by the vibration of the table and the pressure of the second pressure water.

In this case, the collecting may include collecting the material having a greater specific gravity among the materials, which are sorted by the first sorting operation or the second sorting operation and have the grain sizes belonging to the predetermined range, through a first collecting unit positioned in a progress direction according to the reciprocation of the table while moving along the guide bar.

Further, the collecting may further include collecting the material having a smaller specific gravity among the materials, which are sorted by the first sorting operation or the second sorting operation and have the grain sizes belonging to the predetermined range, through a second collecting unit positioned in a direction, in which the second pressure water is provided, while moving along the direction in which the second pressure water is provided.

Further, the collecting may further include collecting the material not being collected in the first collecting unit and the second collecting unit, which are sorted by the first sorting operation or the second sorting operation, and have the grain sizes belonging to the predetermined range, through a third collecting unit.

In the meantime, the third sorting operation may further include moving the materials collected in the third collecting unit to the filler supply unit.

Further, the third sorting operation may further include dehydrating and drying the materials collected in the first collecting unit and the second collecting unit.

In the meantime, the third sorting operation may further include sucking the materials having the smaller specific gravities when the materials having the smaller specific gravities among the materials, which are sorted by the first sorting operation or the second sorting operation, and have the grain sizes belonging to the predetermined range, are momentarily fallen from a surface of the table when the table reciprocates.

Further, the third sorting operation may further include removing fine particles irrelevant to the filler in the material having the smaller gravity sucked through the sucking operation.

In the aforementioned method of recycling the filler included in the artificial turf by sorting the filler into the two or more materials, the filler may be sorted into two or more materials, and the two or more materials may include silica and an elastic body.

Next, another technical solution for solving the technical problem of the present invention is to provide an apparatus for recycling a filler included in artificial turf by sorting the filler into two or more materials, including: a first sorting apparatus configured to sort the two or more materials based on a grain size; a second sorting apparatus configured to sort the materials, which are sorted by the first sorting apparatus, and have grain sizes belonging to a predetermined range, based in the specific gravity by using centrifugal force or specific gravity difference; and a third sorting apparatus configured to sort the materials, which are sorted by the first sorting apparatus or the second sorting apparatus and have the grain sizes belonging to the predetermined range, based on specific gravity again by using vibration.

In this case, the first sorting apparatus may include at least one of a trommel screen, a vibration screen, and a multi-screen so as to sort the material having a predetermined grain size or greater by performing sieve-separation.

In the meantime, the second sorting apparatus may include: a housing configured to accommodate the materials, which are sorted by the first sorting apparatus and have the grain sizes belonging to the predetermined range; and a centrifugal force generating unit configured to provide centrifugal force into the housing.

Further, the second sorting apparatus may further include a first pressure water providing unit configured to provide predetermined first pressure water in a direction corresponding to a center axis of the centrifugal force generating unit to separate the materials flowing into the housing by the centrifugal force provided by the centrifugal force generating unit based on the specific gravity difference, in which a first material having a relatively smaller specific gravity may float in the first pressure water to be discharged to an upper side of the housing, and a second material having a relatively greater specific gravity may be discharged to a lower side of the housing by a pressure of the first pressure water.

In addition, the second sorting apparatus may further include: an inlet configured to make the materials, which are sorted by the first sorting apparatus and have the grain sizes belonging to the predetermined range, flow into the housing; a first discharge unit positioned in an upper part of the housing to discharge the first material; and a second discharge unit positioned in a lower part of the housing so as to discharge the second material.

Further, the second sorting apparatus may be a spiral classifier which has a predetermined slope, and sorts a first material having a relatively smaller specific gravity among the materials, which are sorted by the first sorting apparatus and have the grain sizes belonging to the predetermined range, at a low slope position based on a center point, and sorts a second material having a relatively greater specific gravity at a high slope position based on the center point.

Further, the second sorting apparatus may be a cyclone device including an accommodating unit for accommodating materials, which are sorted by the first sorting apparatus and have the grain sizes belonging to the predetermined range, in which a first material having a relatively smaller specific gravity among the materials, which are sorted by the first sorting apparatus and have the grain sizes belonging to the predetermined range, may be sorted at a close position based on a center point of the accommodating unit, and a second material having a relatively greater specific gravity may be sorted at a distant position based on the center point of the accommodating unit.

In the meantime, the third sorting apparatus may include: a table, of which at least two axes among x, y, and z axes are inclined at predetermined angles, and which reciprocates based on at least one axis among the x, y, and z axes; a filler supply unit provided at one side of the table to provide the materials, which are sorted by the first sorting apparatus or the second sorting apparatus and have the grain sizes belonging to the predetermined range, to the table; a second pressure water supply unit provided at the other side of the table different from one side of the table at which the filler supply unit is positioned to provide second pressure water having a predetermined pressure; and a collecting unit configured to collect materials which are sorted by vibration of the table and the pressure of the second pressure water and have grain sizes belonging to a predetermined range.

In this case, in the table, at least two axes among the x, y, and z axes inclined at the predetermined angles may have slopes of 0.1 to 20°.

Further, the table may reciprocate at a speed of 100 rpm to 800 rpm.

In addition, the table may include one or more guide bars provided in a direction parallel to a reference axis of the reciprocation to guide a movement of the material having a greater specific gravity among the materials, which are sorted by the first sorting operation or the second sorting operation and have grain sizes belonging to a predetermined range.

In the meantime, the collecting unit may include: a first collecting unit configured to collect a material having a greater specific gravity among the materials which are sorted by the first sorting apparatus or the second sorting apparatus and have the grain sizes belonging to the predetermined range; a second collecting unit configured to collect a material having a smaller specific gravity among the materials which are sorted by the first sorting apparatus or the second sorting apparatus and have the grain sizes belonging to the predetermined range; and a third collecting unit configured to collect the material not being collected in the first collecting unit and the second collecting unit, which are sorted by the first sorting apparatus or the second sorting apparatus, have grain sizes belonging to the predetermined range, through a third collecting unit.

In this case, the first collecting unit may be positioned in a progress direction according to the reciprocation of the table.

Further, the second collecting unit may be positioned in a direction in which the second pressure water is provided.

In addition, the third sorting apparatus may further include a transferring unit configured to move the materials collected by the third collecting unit to the filler supply unit.

Further, the third sorting apparatus may further include: a dehydrating apparatus configured to dehydrate the materials collected in the first collecting unit and the second collecting unit; and a dry device configured to dry the materials collected in the first collecting unit and the second collecting unit.

In the meantime, the third sorting apparatus may further include: a table, of which at least two axes among x, y, and z axes are inclined at predetermined angles, which reciprocates based on at least one axis among the x, y, and z axes, and on which the materials, which are sorted by the first sorting apparatus or the second sorting apparatus and have grain sizes belonging to the predetermined range, are laid; a suction unit configured to suck the materials having the smaller specific gravities when the materials having the smaller specific gravities among the materials, which are sorted by the first sorting operation or the second sorting operation, and have the grain sizes belonging to the predetermined range, are momentarily fallen from a surface of the table when the table reciprocates; and a fine particle removing unit configured to remove fine particles irrelevant to the filler in the material having the smaller gravity sucked through the suction unit.

In the aforementioned apparatus for recycling the filler included in the artificial turf by sorting the filler into the two or more materials, the filler may be sorted into two or more materials, and the two or more materials may include silica and an elastic body.

Advantageous Effects

According to the sorting method and the sorting apparatus for recycling the filler included in the artificial turf according to the present invention suggested as the technical solution, it is possible to easily recycle the filler included in the artificial turf, and separate two or more materials included in the filler with high purity (99% or greater).

However, an effect of the present invention is not limited to the aforementioned effect, and those skilled in the art will clearly understand non-mentioned other effects through the following description.

Figure 1:
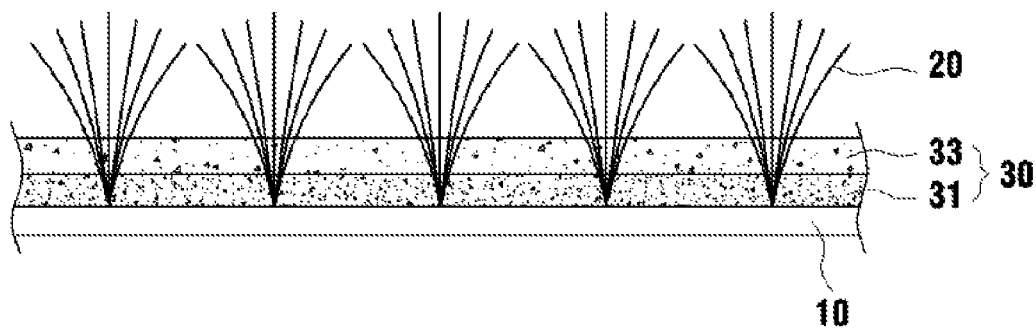
FIG. 1 is a cross-sectional view illustrating artificial turf.

[Descriptions of Main Reference Numerals of Drawings]

| | | | |
|---|---|---|---|
| 10: | Base | | |
| 20: | Turf layer | | |
| 30: | Filler | | |
| 31: | Silica | 33: | Elastic body |
| 100: | First sorting apparatus | | |
| 200: | Second sorting apparatus | | |
| 210: | Housing | 220: | Centrifugal force generating unit |
| 230: | First pressure water providing unit | 250: | Housing |
| 260: | Spiral classifier | 270: | Discharge guide |
| 300: | Third sorting apparatus | | |
| 310: | Vibration plate | 320: | Filler supply unit |
| 330: | Second pressure water providing unit | 340: | Collecting unit |
| 350: | Housing | 360: | Vibration plate |
| 370: | Suction unit | 380: | Connection path |
| 390: | Fine particular removing unit | | |

BEST MODE

Hereinafter, an exemplary embodiment of the present invention will be described in detail with reference to the accompanying drawings. However, in describing the present invention, descriptions of already publicly known functions or configurations will be omitted so as to clarify a main point of the present invention.

Also, in describing the present invention, terms indicating directions, such as a front direction and a rear direction, or an upper side and a lower side, are described so as to make those skilled in the art be clearly understood, and indicate relative directions, so that the scope of the present invention is not limited by the terms.

In the meantime, the present invention is not limited to a sorting apparatus for recycling a filler included in artificial turf, but includes even a sorting method, but a description of an exemplary embodiment of the sorting apparatus itself includes even an exemplary embodiment of the sorting method, so that the sorting apparatus and the sorting method are not separated for description, and an exemplary embodiment of the sorting method and an exemplary embodiment of the sorting apparatus will be appropriately described together so as to make those skilled in the art clearly recognize the present invention from the present specification.

Figure 2:
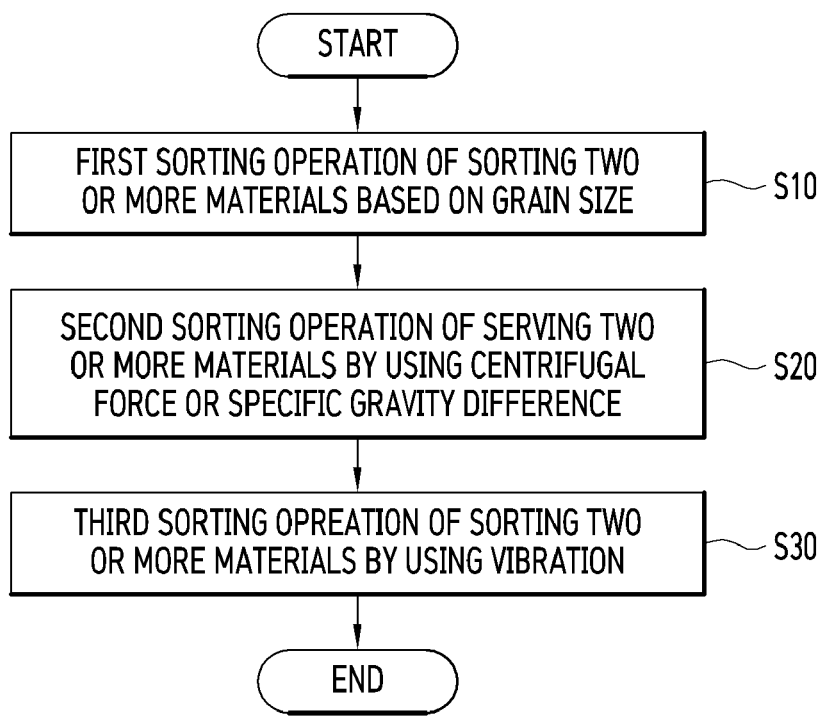
FIG. 2 is a flowchart illustrating an exemplary embodiment of a sorting method for recycling a filler included in artificial turf according to the present invention.
Figure 3:
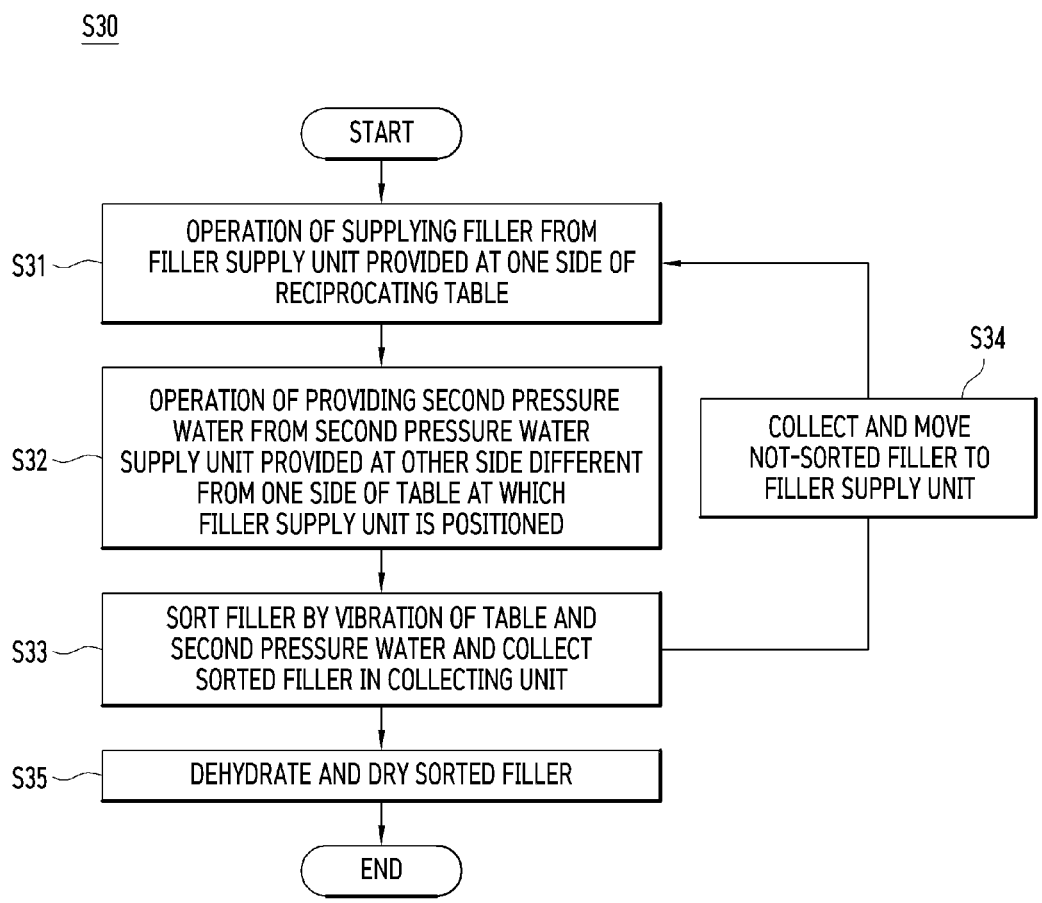
FIG. 3 is a flowchart illustrating an example of performance of the third sorting operation in the flowchart of FIG. 2.

As illustrated in FIGS. 2 and 3, a sorting method for recycling a filler included in artificial turf according to the present invention may include a first sorting operation (S10), a second sorting operation (S20), and a third sorting operation (S30).

Figure 4:
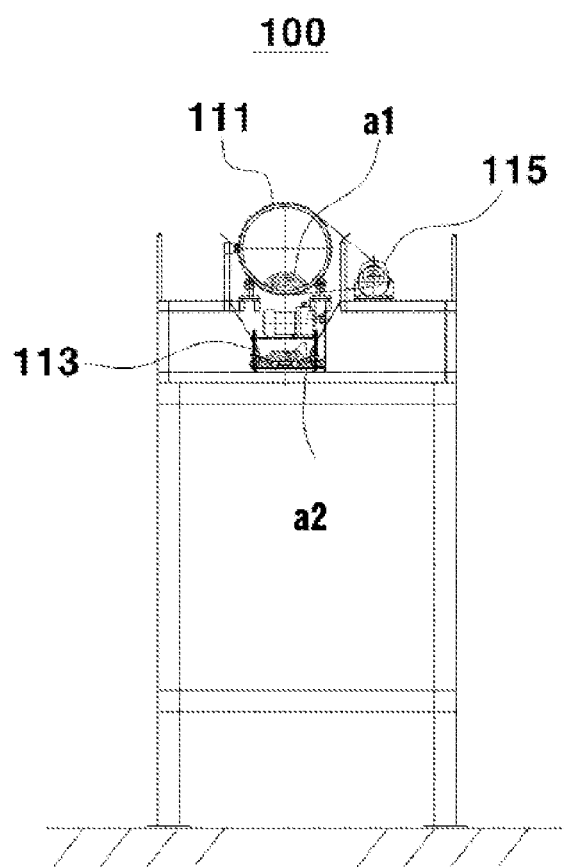
FIG. 4 is a front view illustrating an example of a first sorting apparatus in a sorting apparatus for recycling a filler included in artificial turf according to the present invention.
Figure 5:
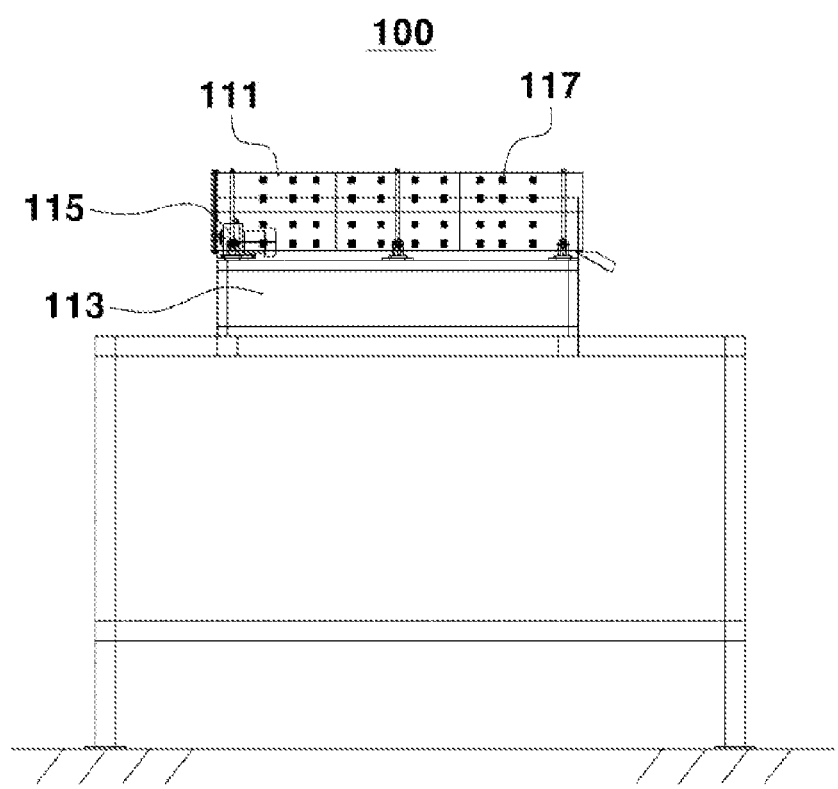
FIG. 5 is a lateral view illustrating an example of the first sorting apparatus illustrated in FIG. 4.

The first sorting operation (S10) is an operation for sorting two or more materials based on a grain size, and may be performed by a first sorting apparatus 100 as illustrated in FIGS. 4 and 5. In this case, the first sorting apparatus 100 is only an example necessary for performing the first sorting operation (S10), by which the scope of the present invention is not limited as a matter of course, and it has been aforementioned that the first sorting apparatus 100 illustrated in FIGS. 4 and 5 is also described based on a configuration of an exemplary embodiment of the sorting apparatus for recycling the filler included in the artificial turf according to the present invention as an example.

The first sorting apparatus 100 may sort a first material and a second material, which form the filler, based on a grain size. For example, in a ratio of content of the first material according to a grain size, a ratio of a grain size between 1 to 3 mm is the largest, and various grain sizes may be sequentially contained. Similarly, in a ratio of content of the second material according to a grain size, a ratio of a grain size between 0.1 to 0.9 mm is the largest, and various grain sizes may be sequentially contained.

Here, the first sorting apparatus 100 may sort only the material having the grain size of 1 to 3 mm included with the largest ratio in the first material, and sorts about 1 to 40%, preferably, about 10 to 30%, of the entire first material. Accordingly, the first sorting apparatus 100 may include a screen through which the material having the grain size of 1 to 3 mm or greater may be sieve separated.

Accordingly, as long as the first sorting apparatus 100 includes the screen through which a material having a predetermined grain size or greater for sieve-separating, the first sorting apparatus 100 may be any type of device.

That is, the first sorting apparatus 100 may include a screen through which a material having a range of the largest grain size in the filler may be sieve separated. For example, the first sorting apparatus 100 may be formed by at least one of a trammel screen, a vibration screen, and a multi-screen.

The first sorting apparatus 100 may dry or wet sort the material by sieve separating the material having the range of the largest grain size among the two or more materials included in the filler. Preferably, the first sorting apparatus 100 may dry sort the material.

Accordingly, the first material by a predetermined ratio may be sorted by the first sorting apparatus 100. As described above, when the first sorting operation (S10) is completed, the first material and the second material, which are left after the sorting, exist while being mixed, and the existing mixture is subjected to the second sorting operation (S20), which is to be described below.

In this case, the mixture has the grain size belong to a predetermined range by the first sorting operation (S10). That is, the first material having the grain size of 1 to 3 mm or greater is separated through the first sorting operation (S10), so that the range of the grain size of the first material is similar to the scope of the grain size, which the second material contains by a great ratio. Accordingly, in the second sorting operation (S20), which is to be described below, the first material and the second material may be separated based on specific gravity.

The first sorting apparatus 100 described above may include a screen 111, a filtered material accommodating part 113, and a rotating part 115.

The screen 110 includes a plurality of sorting holes 117 through which the material having a predetermined grain size or greater may be sieve separated, and it is illustrated that the screen 111 illustrated in FIGS. 4 and 5 is a trammel screen as an exemplary embodiment. In this case, as long as the screen may separate the material having a predetermined grain size or greater according to an intention of the present invention, any type of screen may be included as a matter of course.

Here, the predetermined grain size or greater means a grain size of the largest range in the filler including two or more materials flowing into the screen 111 of the first sorting apparatus 100.

For example, when the filler includes the first material, which may have a grain size of 0.01 mm to 3 mm, and have the grain size of 1 to 3 mm by the largest ratio in the grain size, and the second material, which may have a grain size of 0.01 mm to 3 mm, and have the grain size of 0.1 to 0.9 mm by the largest ratio in the grain size, the sorting holes 117 may have a size, in which the materials having the grain size of less than 1 mm pass through, in order to sort only the material having the grain size of 1 to 3 mm included by the largest ratio in the first material.

Accordingly, a first material a1 having the grain size of 1 mm or greater, which cannot pass through the sorting holes 117, in the first material included in the filler flowing into the first sorting apparatus 100 is present inside the screen 111, and the remaining first material having the grain size of less than 1 mm passing through the sorting holes 117 and a second material a2 may be accommodated in the filtered material accommodating part 113.

In this case, the size of the sorting holes 117 may be adjusted in response to the grain sizes of the materials included in the filler, and the written numerical values of the grain sizes are simply the exemplary embodiment for describing the present invention in detail.

The rotating part 115 applies rotational force to the screen 111, and makes the first material and/or the second material be sieve separated according to the size of the sorting holes 117 while the screen rotates.

The first material having the grain size equal to or larger than the size of the sorting hole in the filler including the first material and the second material may be sorted by about 1 to 40%, preferably, about 20 to 30%, in the entire first material included in the filler by the first sorting apparatus 100.

When the first material having the grain size, which cannot pass through the sorting holes 117, is sorted by the predetermined ratio, the remaining first material and the second material are transferred to the second sorting apparatus 200.

In the meantime, it is illustrated in the exemplary embodiment the first sorting apparatus 100 illustrated in FIGS. 4 and 5 separates the material according to the grain size by the dry method, but the present invention is not limited thereto, and the first sorting apparatus 100 may separate the material by a wet method.

Subsequent to the aforementioned first sorting operation (S10), the second sorting operation (S20) is performed, which is an operation for sorting the materials having the grain sizes belonging to a predetermined range sorted in the first sorting operation (S10) based on specific gravity.

Figure 6:
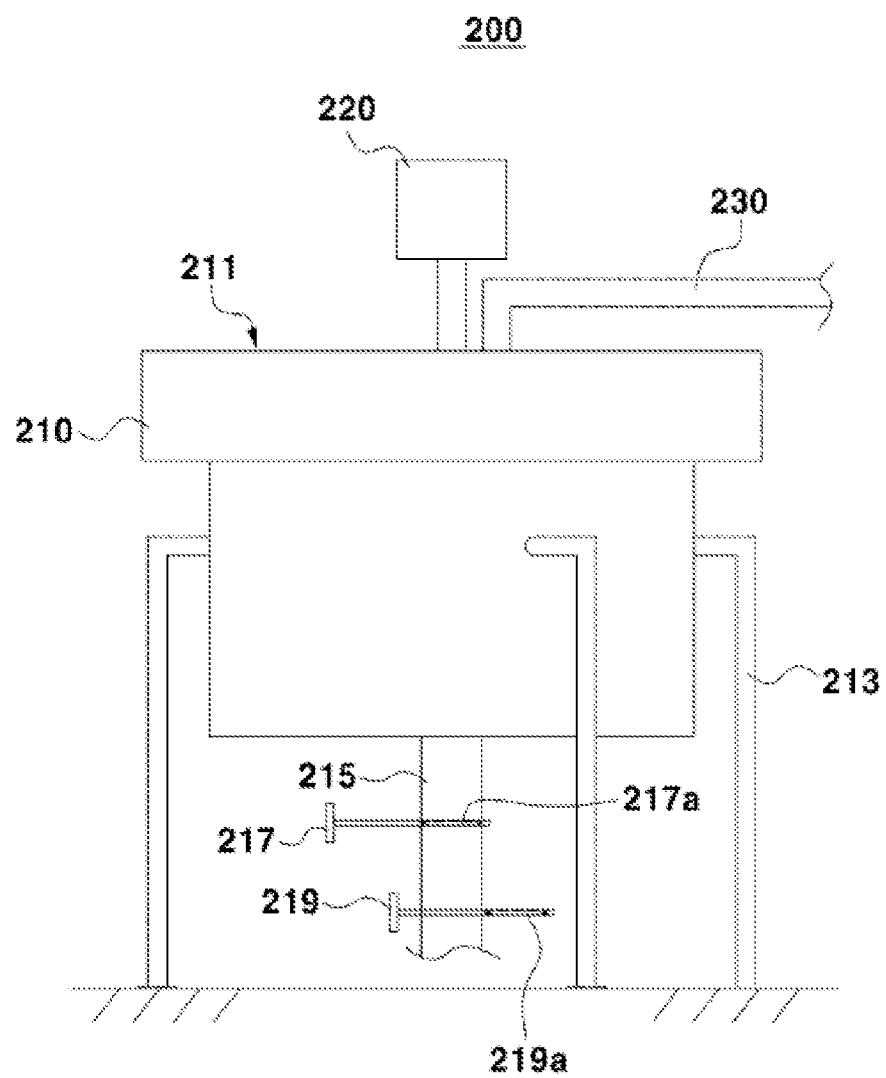
FIG. 6 is a schematic view illustrating an example of a second sorting apparatus in the sorting apparatus for recycling the filler included in the artificial turf according to the present invention.
Figure 7:
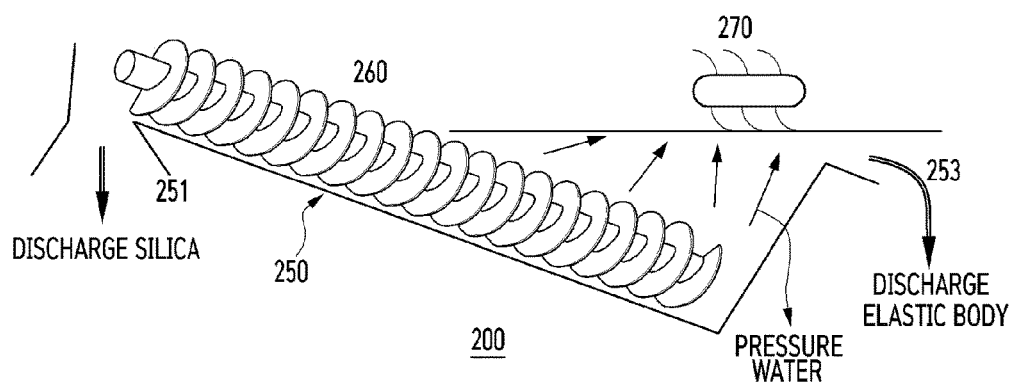
FIG. 7 is a schematic view illustrating another example of a second sorting apparatus in the sorting apparatus for recycling the filler included in the artificial turf according to the present invention.

In the second sorting operation (S20), the materials having the grain sizes belonging to the predetermined range sorted in the first sorting operation (S10) are sorted by using centrifugal force or specific gravity difference, which may be performed by the second sorting apparatus 200 illustrated in FIGS. 6 and 7. In this case, the second sorting apparatus 200 is only an example necessary for performing the second sorting operation (S20), by which the scope of the present invention is not limited as a matter of course, and it has been aforementioned that the second sorting apparatus 200 illustrated in FIGS. 6 and 7 is also described based on a configuration of an exemplary embodiment of the sorting apparatus for recycling the filler included in the artificial turf according to the present invention as an example.

The second sorting apparatus 200 may be configured as illustrated in FIG. 6, but is not essentially limited thereto, and may be configured as illustrated in FIG. 7, and hereinafter, an example of the second sorting apparatus 200 which may be described with reference to FIG. 6 and another example of the second sorting apparatus 200 which may be described with reference to FIG. 7 will be sequentially described.

First, an example of the second sorting apparatus 200 will be described with reference to FIG. 6, and the second sorting apparatus 200 may include, for example, a housing 210, a centrifugal force generating unit 220, and a first pressure water providing unit 230.

The housing 210 is a constituent element for accommodating the materials having the grain sizes belonging to the predetermined range selected through the first sorting operation (S10), and the second sorting apparatus 200 includes an inflow unit 211 into which two or more materials having the grain size with the predetermined range, that is, the filtered substances, which pass through the screen 111 of the first sorting apparatus 100 and then are accommodated in the filtered substance accommodating unit 115, a first discharge unit 213 which is positioned at an upper side of the housing 210 to discharge a material having smaller specific gravity among the two or more materials, and a second discharge unit 215 which is positioned at a lower side of the housing 210 to discharge a material having a greater specific gravity among the two or more materials, in association with the housing 210.

The second discharge unit 215 includes a first discharge plate 217 and a second discharge plate 219, and the first and second discharge plates 217 and 219 include first and second holes 217a and 219a having an area and a diameter corresponding to a cross-sectional area and a diameter of the second discharge unit 215, respectively. The first discharge plate 217 and the second discharge plate 219 are provided to be horizontally movable along the cross-section of the second discharge unit 215.

Functions of the first discharge plate 217 and the second discharge plate 219 will be described again below.

The centrifugal generating unit 220 includes a rotating unit (not illustrated) and a power providing unit (not illustrated). The rotating unit (not illustrated) is positioned inside the housing 210 to be rotated based on a predetermined center axis to provide centrifugal force to water flowing into the housing 210, and may include an impeller as an exemplary embodiment. The power providing unit (not illustrated) is positioned outside the housing 210 to supply electric energy necessary for rotation of the rotating unit (not illustrated), and may include a motor.

The first pressure water providing unit 230 provides pressure water having a predetermined pressure in a direction of the center axis, based on which the rotating unit (not illustrated) rotates, toward the second discharge unit 215 from the inflow unit 211 of the housing 210.

Accordingly, an inside of the housing 210 is completely filled with the pressure water provided by the first pressure water providing unit 230, and the completely filled water has centrifugal force while rotating in a predetermined direction by the centrifugal force generating unit 220.

The filtered material accommodated in the filtered material accommodating part 113 of the first sorting apparatus 100 flows in through the inflow unit 211. The filtered material includes the first material and the second material left after the first sorting, and specific gravity of the first material is relatively lower than specific gravity of the second material. However, the ranges of the grain sizes of the first material and the second material are similar to each other.

When the first material and the second material flow in, the second material having the relatively greater specific gravity than buoyancy of the pressure water tends to sink to the bottom, and the first material having the relatively smaller specific gravity than the buoyancy of the pressure water tends to flow upwardly. In this case, difference in the specific gravity between the two materials is noticeable by the centrifugal force generated by the centrifugal force generating unit 220, so that the first material tends to flow to the upper side of the housing, and the second material tends to sink to the lower side of the housing. The difference in the specific gravity between the two materials may be maximized by the pressure water by the buoyance having a predetermined size provided by the first pressure water providing unit 230.

The pressure water provided by the first pressure water providing unit 230 is provided toward the second discharge unit 215 from the inflow unit 211 of the housing 210, so that the second material having the greater specific gravity than the buoyance may well move to the lower side of the housing 210 by the buoyance of the provided pressure water to be discharged to the second discharge unit 215 together with the pressure water. Further, when the inside of the housing is filled with the amount of provided pressure water, the first material having the smaller specific gravity than the buoyance of the pressure water floats well in the water and is collected to the upper side of the housing 210 to be discharged through the first discharge unit 213.

As described above, the second discharge unit 215 includes the first discharge plate 217 and the second discharge plate 219. When the second material sinks to the lower side of the housing and the first material floats in the upper side of the housing by the difference in the specific gravity between the two materials, the first discharge plate 217 and the second discharge plate 219 block the second discharge unit 215 until a predetermined amount of second material is filled. That is, the first hole 217a and the second hole 219a are prevented from being positioned inside the second discharge unit 215.

Accordingly, until the second material is piled on the first discharge plate 217 by a predetermined level, the housing 210 including the pressure water has uniform pressure, so that the first material and the second material may be properly sorted based on specific gravity.

When the second material is piled on the first discharge plate 217 by the predetermined level, the first discharge plate 217 moves and the first hole 217a enters the second discharge unit 215, so that the second material on the first discharge plate 217 is piled on the second discharge plate 219. When the second material completely moves on the second discharge plate 219, the first discharge plate 217 moves to an original state again to uniformly maintain the pressure of the housing 210, and then the second discharge plate 219 moves again and the second hole 219a enters the second discharge unit 215, so that the second material may be discharged. The movement of the first discharge plate 217 and the second discharge plate 219 may be designed to be automatically performed based on a weight of the second material, detection of the pressure of the housing 210, and the like.

The first material discharged through the first discharge unit 213 includes only the first material of 99% or greater, and the first material sorted through the first sorting and the second sorting may be sorted by about 70 to 90% or greater in the entire first material.

The discharged material discharged through the second discharge unit 215 may include the first material swept by the pressure of the pressure water by a predetermined ratio, as well as the second material having the greater specific gravity.

Then, the discharged material passing through the second sorting apparatus 200 to be discharged through the second discharge unit 215 is transferred to the third sorting apparatus 300, which is to be described below, so as to sort the discharged material with higher purity through a drain 217, and the third sorting operation (S30), which is to be described below, is subsequently performed.

In the meantime, another example of the second sorting apparatus 200, which may be described with reference to FIG. 7, will be described below next to the description of the example of the second sorting apparatus 200 which may be described with reference to FIG. 6.

Another example of the second sorting apparatus 200, which may be described with reference to FIG. 7, includes a housing 250, a spiral classifier 260, a first pressure water providing unit (not illustrated), and a discharge guide 270.

The housing 250 may have an elongated tank shape having a predetermined slope, or an upper side of the tank shape may be exposed. The housing 250 may include a first discharge part 251 at a part having a greater slope, and a second discharge part 253 at a low slope part.

The spiral classifier 260 is accommodated inside the housing 250 to have almost the same/similar slope as/to that of the housing 250, and may allow the material having the relatively greater specific gravity to move the first discharge part 251 while rotating. Accordingly, the second material having the relatively greater specific gravity moves to the part having the greater slope by the spiral classifier 260 to be finally discharged through the first discharge part 251.

The spiral classifier 260 serves to stir water and makes the first material having the relatively lower specific gravity float on the water when the first material and the second material positioned at the low slope part of the housing exist in the water by the water provided by the first pressure water providing unit (not illustrated), and further, the second material having the relatively greater specific gravity is transferred to an upper side of the spiral classifier 260.

The first pressure water providing unit (not illustrated) is positioned at the lower side of the housing 250 to provide the pressure water, and may be sunk by the pressure water provided by the first pressure water providing unit (not illustrated) at a low slope position of the spiral classifier 260. The first material having the relatively smaller specific gravity stays at the lower side of the spiral classifier 260, that is, the low slope position, and the pressure water provided by the first pressure water providing unit (not illustrated) is provided in a direction different from a progress direction (a direction toward the first discharge unit) of the spiral classifier 260 (for example, the pressure water is provided in a direction opposite to that of the gravity), the first material having the relatively smaller specific gravity floats in the water by the provided pressure water, and the first material having the relatively smaller specific gravity mostly floats due to an influence of the pressure of the provided pressure water. It is possible to maximize an effect of the sorting according to the specific gravity of the two materials, which are separated according to the specific gravity by the spiral classifier 260, by the first pressure water providing unit (not illustrated), thereby achieving an excellent sorting effect.

The discharge guide 270 may guide discharge of the first material floating by the pressure water. The discharge guide 270 is provided in the form taking in the floating first material or the form inducing upper water of the pressure water to flow in the direction of the second discharge unit 253, so that the first material having the smaller specific gravity is relatively easily discharged to the second discharge unit 253 to be sorted.

In addition to the aforementioned example of the second sorting apparatus 200, which is described with reference to FIG. 7, the second sorting apparatus 200 may be formed of a cyclone device which is not illustrated.

That is, yet another example of the second sorting apparatus 200 may be configured by a cyclone device including an accommodating unit (not illustrated) for accommodating the materials having the grain sizes belonging to the predetermined range sorted by the first sorting apparatus 100.

According to yet another example of the second sorting apparatus 200 configurable by the cyclone device, the first material having the relatively smaller specific gravity among the materials having the grain sizes belonging to the predetermined range sorted by the first sorting apparatus 100 may be sorted at a close position based on a center portion of the accommodating unit (not illustrated), and the second material having the relatively greater specific gravity may be sorted at a distant position based on the center portion of the accommodating unit (not illustrated).

Subsequent to the aforementioned first sorting operation (S10) or the second sorting operation (S20), the third sorting operation (S30) is performed, and the third sorting operation (S30) is an operation for sorting the materials having the grain sizes belonging to the predetermined range sorted in the first sorting operation (S10) or the second sorting operation (S20) based on the specific gravity.

That is, the third sorting operation (S30) may be performed immediately after the first sorting operation (S10), and may be sequentially performed next to the first sorting operation (S20) and the second sorting operation (S20).

Figure 8:
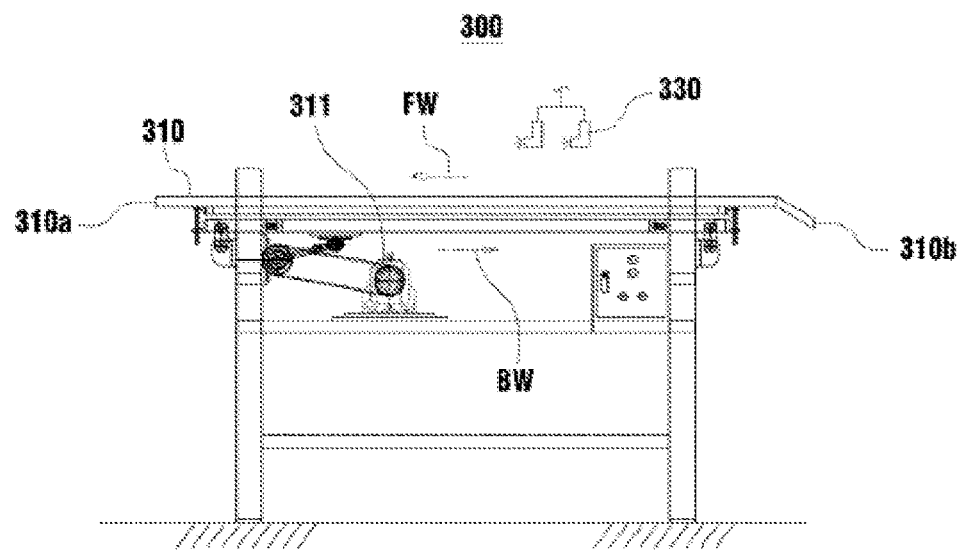
FIG. 8 is a front view illustrating an example of a third sorting apparatus in a sorting apparatus for recycling a filler included in artificial turf according to the present invention.
Figure 9:
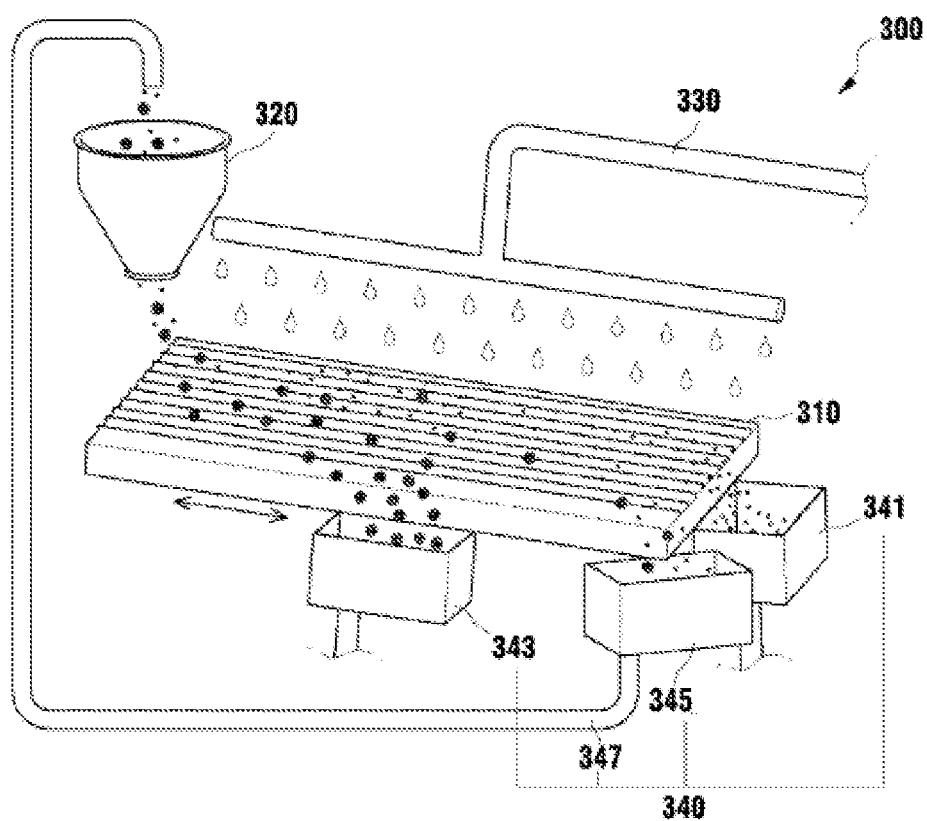
FIGS. 9 and 10 are schematic views illustrating an example of the third sorting apparatus illustrated in FIG. 8.
Figure 10:
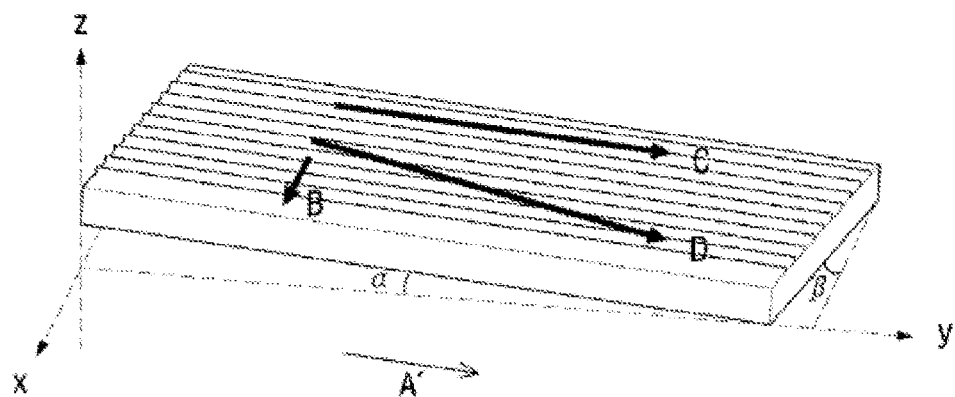
Figure 11:
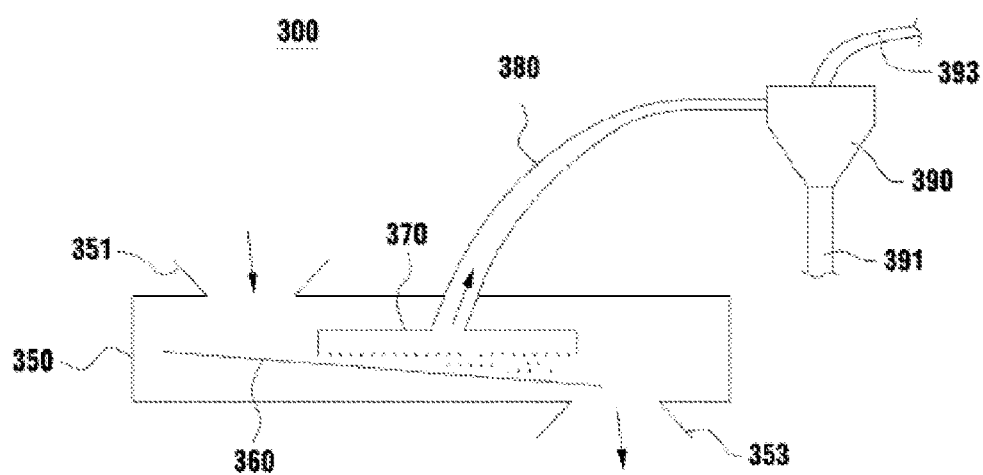
FIG. 11 is a schematic view illustrating another example of the third sorting apparatus in the sorting apparatus for recycling the filler included in the artificial turf according to the present invention.

In the third sorting operation (S30), the materials having the grain sizes belonging to the predetermined range sorted in the first sorting operation (S10) or the second sorting operation (S20) may be sorted by using vibration, which may be performed by the third sorting apparatus 300 illustrated in FIGS. 8 to 11. In this case, the third sorting apparatus 300 is only an example necessary for performing the third sorting operation (S30), by which the scope of the present invention is not limited as a matter of course, and it has been aforementioned that the third sorting apparatus 300 illustrated in FIGS. 8 and 11 is also described based on the configuration of the exemplary embodiment of the sorting apparatus for recycling the filler included in the artificial turf according to the present invention as an example.

First, the third sorting operation (S30) will be briefly described with reference to FIG. 3 before describing the third sorting apparatus 300 illustrated in FIGS. 8 to 11 (in this case, reference numerals related to the third sorting apparatus 300 will be omitted).

As illustrated in FIG. 3, in the third sorting operation (S30), a filler is supplied from a filler supplying unit provided at one side of a reciprocating table (S31), second pressure water is supplied from a second pressure water supply unit provided at a side of the table different from the side of the table at which the filler supply unit is positioned (S32), and next, the filler is sorted by vibration of the table and the second pressure water to be collected in a collecting unit (S33).

Further, after the collecting of the filler (S33), the filler, which is not sorted, may move to a filler void (S34), or the sorted filler may be hydrated and dried (S35).

The third sorting apparatus 300 capable of performing the third sorting operation (S30) may be configured as illustrated in FIGS. 8 to 10, but is not essentially limited thereto, and may be configured as illustrated in FIG. 11, and the example of the third sorting apparatus 300, which will be described with reference to FIGS. 8 to 10, and another example of the third sorting apparatus 300, which will be described with reference to FIG. 11, will be sequentially described.

First, the third sorting apparatus 300 which may be described with reference to FIGS. 8 to 11 is a device including, for example, a vibration plate 310 and a plurality of second pressure water supply unit 320, to sort two materials having the grain sizes belonging to the predetermined range based on specific gravity by using vibration after the first sorting operation (S10) or the second sorting operation (S20).

The vibration plate 310 has a plate shape having a predetermined area, and the discharged material discharged through the second discharge unit 215 of the second sorting apparatus 200 flows in through one side surface 310 of the vibration plate 310, and some of the discharged material moves to the other side surface 310b of the vibration plate 310.

The discharged material discharged from the second discharge unit 215 of the second sorting apparatus 200 as described above may include the first material having the smaller specific gravity, as well as the second material having the greater specific gravity. The second material and the first material flow in through the one side surface 310a of the vibration plate 310, the vibration plate 310 generates vibration so that the inflow material moves in a predetermined progress direction BW, and the vibration is generated by a vibration generating unit 311.

In this case, the vibration plate 310 has a slope based on at least one axis among an x-axis, a y-axis, and an z-axis. For example, in describing the case where the vibration plate 310 has a slope in the direction of the x-axis, the first material and the second material flow in through the one side surface 310a of an upper part in the inclined part, and the second material having the greater specific gravity further moves to a lower part in the inclined part while forming a parabola by the vibration in a progress direction. Since the first material has the relatively smaller specific gravity, the first material stays at the upper part in the inclined part, and cannot move far in a progress direction of the vibration compared to the second material even when vibrating.

In this case, the plurality of second pressure water providing unit 230 may provide the pressure water in a different direction (or opposite direction) FW from the progress direction BW of the vibration. In this case, in the plurality of second pressure water providing unit 230, a plurality of nozzles may be serially provided to be vertical to the progress direction BW of the vibration, and the plurality of serially provided nozzles may be repeated several times. Pressure water having different pressures may be provided from the plurality of nozzles, and when a row including the plurality of nozzles is provided in plural, the pressure water having different pressures may be provided through the respective rows, respectively.

A providing direction of the pressure water provided by the plurality of second pressure water providing unit 230 is the direction FW different from the progress direction BW of the vibration, so that the first material having the relatively smaller specific gravity moves toward the one side surface 310a of the vibration plate 310 by the pressure water, and the second material having the relatively greater specific gravity moves to the other side surface 310b of the vibration plate 310 according to the progress direction BW of the vibration by the vibration of the vibration plate 310.

Accordingly, when the first material and the second material pass through the third sorting apparatus 300, each of the first material and the second material is separated so as to have purity of 99% or more, so that each of the first material and the second material may be recycled for a predetermined use.

To describe this in detail, the third sorting apparatus 300 may include a table 310, a filler supply unit 320, a second pressure water supply unit 330, and a collecting unit 340.

The table 310 reciprocates based on any one axis of the x, y, and z axes, in which at least two axes among the x, y, and z axes are inclined at predetermined angles ($\alpha$ and $\beta$). The table 310 may have a general rectangular shape, which is one example, and may include other forms.

As illustrated in FIG. 10, in the table 310, at least two axes among the three axes of the x, y, and z axes are inclined at the predetermined angles ($\alpha$ and $\beta$). For example, $\alpha$ and $\beta$ may be inclined at 0.1 to 20° based on each reference axis.

For example, the inclined axes may be the axes in which the filler supply unit 320 and the second pressure water supply unit 330 are positioned based on the table 310, and slopes at the sides, at which the filler supply unit 320 and the second pressure water supply unit 330 are positioned, may be large, and slopes of the opposite parts may be small.

Further, the table 310 may reciprocate based on any one axis among the x, y, and z axes, and for example, the table 310 may reciprocate in direction A that is the direction of the y axis as illustrated in FIG. 1. The table 310 may further include a predetermined motor unit (not illustrated) so as to reciprocate. The motor unit (not illustrated) may make the table 310 reciprocate at a speed of 100 to 800 rpm.

Further, the table 310 may be one or more guide bars provided on an upper surface thereof in a direction parallel to a reference axis of the reciprocation to guide a movement of the material having the greater specific gravity among the two or more materials. The guide bar may be formed in a concave-convex part having a predetermined height on the upper surface of the table 310, and a cross-section of the concave-convex part may be, for example, a triangle.

In the meantime, the filler supply unit 320 may supply the filler in which the two or more materials are mixed at one side of the table 310.

The filler supply unit 320 is connected with a drain 217 of the second sorting apparatus to supply the filler to the table 310 in which the two or more materials discharged through the drain 217 are mixed.

In the meantime, the second pressure water supply unit 330 may be provided to be spaced apart from the other side of the side of the table 310, at which the filler supply unit 320 is positioned, by a predetermined height to provide water having a predetermined pressure. Referring to FIG. 9, the second pressure water supply unit 330 is provided to be spaced apart from the other side of the table 310, at which the filler supply unit 320 is not positioned, by a predetermined height to provide water having a predetermined pressure. The pressure water provided by the second pressure water supply unit 330 serves to make the material having the smaller specific gravity among the two or more materials supplied by the filler supply unit 320 flow in the direction in which the pressure water is provided.

The collecting unit 340 may collect the filler sorted by reciprocation of the table 310 and the pressure water supplied by the second pressure water supply unit 330.

That is, the material (for example, silica) having the relatively greater specific gravity in the filler supplied by the filler supply unit 320 flows in a progress direction of the reciprocating the table 310 while minimally receiving influence of the pressure water by the plurality of guide bars 311 provided on the upper surface of the table 310, and is collected in a first collecting unit 341 positioned under the table 310 by a predetermined height in response to the progress direction of the reciprocating table.

In the meantime, when the filler is supplied, and the pressure water is supplied by the second pressure water supply unit 330, the material (for example, an elastic body) having the relatively smaller specific gravity in the filler flows down in the direction in which the pressure water flows down. Accordingly, the material having the relatively smaller specific gravity in the filler is collected in a second collecting unit 343 positioned under the table 310 by a predetermined height in response to the direction in which the pressure water flows.

In the meantime, the silica and the elastic body may not be collected in the first collecting unit 341 and the second collecting unit 343, and may be mixed together still, and the silica and the elastic body are collected in a third collecting unit 345 positioned at a center point between the first collecting unit 341 and the second collecting unit 343.

In describing the aforementioned contents based on the sorting method again, the filler, in which the wet silica and elastic body supplied from the filler supply unit 320 are mixed, is supplied at one side of the table 310 (S31). Water having a predetermined pressure is supplied from the second pressure water supply unit 330 positioned at the other side of the table 310 (S32). The filler is sorted by the reciprocation of the table 310 and the water supplied by the second pressure water supply unit 330 to be collected in the collecting unit (S33).

The collecting operation (S33) may include the followings.

The elastic body having the relatively smaller specific gravity than that of the silica moves in a direction (direction B) together with the pressure water, in which the pressure water flows down, while floating in the water by the supplied pressure water, and the elastic body is collected in the second collecting unit 343 positioned at the side of the table facing the second pressure water supply unit 330 in response to the movement direction of the pressure water (S331). In this case, as described above, the side of the table 310, at which the second pressure water supply unit 330 is positioned, has a larger slope than that of the opposite side thereof, so that the elastic body may be sorted while more easily flowing down together with the pressure water.

Further, when the table 310 reciprocates in direction A, the materials move in the direction facing the filler supply unit 320. The silica having the relatively greater specific gravity supplied by the filler supply unit 320 moves in the progress direction of the reciprocating table 310 without being separated from the table 310 by the plurality of guide bars provided on the upper surface of the table 310.

The silica moves in direction C by the influence of the vibration according to the reciprocation to be collected in the first collecting unit 341 positioned in response to the movement in direction C. In this case, as described above, the side of the table 310, the side, at which the filler supply unit 320 is positioned, has the larger slope than that of the opposite side thereof, so that the silica may be sorted while more easily moving in direction C by the vibration of the reciprocation.

In the meantime, the silica and the elastic body may not be sorted by the reciprocation of the table and the pressure water, and exist while still being mixed, so that the silica and the elastic body move in direction D and are collected in the third collection unit 345 positioned in response to the movement in direction D, and are supplied to the filler supply unit 320 through a transference unit 347 to perform sorting operations S31 to S33 again, which may be repeatedly performed several times until the silica and the elastic body are sorted by purity of 99.9%.

Accordingly, the sorting apparatus for recycling the filler according to the exemplary embodiment of the present invention separates two or more materials having different specific gravities to have purity of 99% or more, so that each of the first material and the second material may be recycled for a predetermined desired use.

In the meantime, in the description of the example of the third sorting apparatus 300, which may be described with reference to FIGS. 8 to 10, another example of the third sorting apparatus 300, which may be described with reference to FIG. 11, will be described below.

Another example of the third sorting apparatus 300, which may be described with reference to FIG. 11, includes a housing 350, a vibration plate 360, a suction unit 370, and a fine particle removing unit 390.

An inlet 211 is provided on the housing 350, so that the mixture after the first or second sorting by the first sorting apparatus 100 or the second sorting apparatus 200 may flow in.

The vibration plate 360 is provided inside the housing 350 to accommodate the mixture flowing in from the inlet 211. The two materials (the mixture after the first sorting) having the grain size belonging to the predetermined range may be sorted by using the vibration based on the specific gravity.

The vibration plate 360 has a slope based on at least one axis among an x-axis, a y-axis, and a z-axis, and generates a vibration in a predetermined progress direction. As illustrated in FIG. 11, the vibration plate 360 has a predetermined slope based on the y axis, and the vibration is generated in a direction from a high slope part to a low slope part. The inlet 211 is provided at the high slope part of the vibration plate 360, so that the remaining mixture after the first sorting flows in to the high slope part of the vibration plate 360. The second material having the relatively greater specific gravity moves to the low slope part of the vibration plate 360 by the slope, the vibration, and the vibration direction of the vibration plate 360, so that the second material is discharged through the first discharge unit 353 positioned at the low slope part. Contrary to this, the first material having the relatively smaller specific gravity moves more slowly than the second material, and bounds higher from the vibration plate 360 by the vibration of the vibration plate 360.

The first material is sucked through the suction unit 370 provided inside the housing 350 to be transferred to the fine particle removing unit 390 through a connection path 380 connecting the suction unit 370 and the fine particle removing unit 390. As long as the suction unit 370 is a device capable of generating suction force and sucking a predetermined material, any type of suction unit may be used. Some fine particles of the second material may be included in the first material sucked through the suction unit 370. In order to remove the fine particles of the second material, the first material sucked through the suction unit 370 is transferred to the fine particle removing unit 390 through the connection path 380.

The fine particle removing unit 390 may include a cyclone device, and includes a second discharge unit 351 through which the purely separated first material is discharged, and a third discharge unit 393 through which the fine particles are discharged. The cyclone device is provided in a shape of, for example, a cone, and the first material, of which the fine particles are removed along the shape of the cone by centrifugal force, is discharged through the second discharge unit 351, and the fine particles of the second material included in the first material are discharged through the third discharge unit 393, so that the first material may be more purely sorted.

Accordingly, the first material and the second material are separated so as to have purity of 99% or more, so that each of the first material and the second material may be recycled for a predetermined use.

In the meantime, the specific exemplary embodiment of the present invention is described and illustrated as described above, but those skilled in the art will be appreciated that the present invention is not limited to the described exemplary embodiment, and may be variously corrected and modified without departing from the spirit and the scope of the present invention. Accordingly, corrected examples or modified examples should not be individually understood from the technical spirit or the aspect of the present invention, and the modified exemplary embodiments belong to the claims of the present invention.

The invention claimed is:

1. An apparatus for recycling a filler included in artificial turf by sorting the filler into two or more materials, comprising:
   a first sorting apparatus configured to sort the two or more materials based on a grain size;
   a second sorting apparatus configured to sort the materials, which are sorted by the first sorting apparatus, and have grain sizes belonging to a predetermined range, based on the specific gravity by using centrifugal force or specific gravity difference; and
   a third sorting apparatus configured to sort the materials, which are sorted by the first sorting apparatus or the second sorting apparatus and have the grain sizes belonging to the predetermined range, based on specific gravity again by using vibration,
   wherein the third sorting apparatus includes:
      a table, of which at least two axes among x, y, and z axes are inclined at predetermined angles, and which reciprocates based on at least one axis among the x, y, and z axes;
      a filler supply unit provided at one side of the table to provide the materials, which are sorted by the first sorting apparatus or the second sorting apparatus and have the grain sizes belonging to the predetermined range, to the table;

a second pressure water supply unit provided at the other side of the table different from one side of the table at which the filler supply unit is positioned to provide second pressure water having a predetermined pressure; and a collecting unit configured to collect materials which are sorted by vibration of the table and the pressure of the second pressure water and have grain sizes belonging to a predetermined range.

2. The apparatus of claim 1, wherein the first sorting apparatus includes at least one of a trommel screen, a vibration screen, and a multi-screen so as to sort the material having a predetermined grain size or greater by performing sieve-separation.

3. The apparatus of claim 1, wherein the second sorting apparatus includes:

a housing configured to accommodate the materials, which are sorted by the first sorting apparatus and have the grain sizes belonging to the predetermined range; and a centrifugal force generating unit configured to provide centrifugal force into the housing.

4. The apparatus of claim 3, wherein the second sorting apparatus further includes a first pressure water providing unit configured to provide predetermined first pressure water in a direction corresponding to a center axis of the centrifugal force generating unit to separate the materials flowing into the housing by the centrifugal force provided by the centrifugal force generating unit based on the specific gravity difference, in which a first material having a relatively smaller specific gravity floats in the first pressure water to be discharged to an upper side of the housing, and a second material having a relatively greater specific gravity is discharged to a lower side of the housing by a pressure of the first pressure water.

5. The apparatus of claim 4, wherein the second sorting apparatus further includes:

an inlet configured to make the materials, which are sorted by the first sorting apparatus and have the grain sizes belonging to the predetermined range, flow into the housing;

a first discharge unit positioned in an upper part of the housing to discharge the first material; and a second discharge unit positioned in a lower part of the housing so as to discharge the second material.

6. The apparatus of claim 1, wherein the second sorting apparatus is a spiral classifier which has a predetermined slope, and sorts a first material having a relatively smaller specific gravity among the materials, which are sorted by the first sorting apparatus and have the grain sizes belonging to the predetermined range, at a low slope position based on a center point, and sorts a second material having a relatively greater specific gravity at a high slope position based on the center point.

7. The apparatus of claim 1, wherein the second sorting apparatus is a cyclone device including an accommodating unit for accommodating materials, which are sorted by the first sorting apparatus and have the grain sizes belonging to the predetermined range, in which a first material having a relatively smaller specific gravity among the materials, which are sorted by the first sorting apparatus and have the grain sizes belonging to the predetermined range, is sorted at a close position based on a center point of the accommodating unit, and a second material having a relatively greater specific gravity is sorted at a distant position based on the center point of the accommodating unit.

8. The apparatus of claim 1, wherein in the table, at least two axes among the x, y, and z axes inclined at the predetermined angles have slopes of 0.1 to 20°.

9. The apparatus of claim 1, wherein the table reciprocates at a speed of 100 rpm to 800 rpm.

10. The apparatus of claim 1, wherein the table includes one or more guide bars provided in a direction parallel to a reference axis of the reciprocation to guide a movement of the material having a greater specific gravity among the materials, which are sorted by the first sorting operation or the second sorting operation and have grain sizes belonging to a predetermined range.

11. The apparatus of claim 10, wherein the collecting unit includes:

a first collecting unit configured to collect a material having a greater specific gravity among the materials which are sorted by the first sorting apparatus or the second sorting apparatus and have the grain sizes belonging to the predetermined range;

a second collecting unit configured to collect a material having a smaller specific gravity among the materials which are sorted by the first sorting apparatus or the second sorting apparatus and have the grain sizes belonging to the predetermined range; and a third collecting unit configured to collect the material not being collected in the first collecting unit and the second collecting unit, which are sorted by the first sorting apparatus or the second sorting apparatus, have grain sizes belonging to the predetermined range, through a third collecting unit.

12. The apparatus of claim 11, wherein the first collecting unit is positioned in a progress direction according to the reciprocation of the table.

13. The apparatus of claim 11, wherein the second collecting unit is positioned in a direction in which the second pressure water is provided.

14. The apparatus of claim 11, wherein the third sorting apparatus further includes a transferring unit configured to move the materials collected by the third collecting unit to the filler supply unit.

15. The apparatus of claim 11, wherein the third sorting apparatus further includes:

a dehydrating apparatus configured to dehydrate the materials collected in the first collecting unit and the second collecting unit; and a dry device configured to dry the materials collected in the first collecting unit and the second collecting unit.

16. An apparatus for recycling a filler included in artificial turf by sorting the filler into two or more materials, comprising:

a first sorting apparatus configured to sort the two or more materials based on a grain size;

a second sorting apparatus configured to sort the materials, which are sorted by the first sorting apparatus, and have grain sizes belonging to a predetermined range, based on the specific gravity by using centrifugal force or specific gravity difference; and a third sorting apparatus configured to sort the materials, which are sorted by the first sorting apparatus or the second sorting apparatus and have the grain sizes belonging to the predetermined range, based on specific gravity again by using vibration, wherein the third sorting apparatus further includes:

a table, of which at least two axes among x, y, and z axes are inclined at predetermined angles, which reciprocates based on at least one axis among the x, y, and z axes, and on which the materials, which are sorted by the first sorting apparatus or the second sorting apparatus and have grain sizes belonging to the predetermined range, are laid;

a suction configured to suck the materials having the smaller specific gravities when the materials having the smaller specific gravities among the materials, which are sorted by the first sorting operation or the second sorting operation, and have the grain sizes belonging to the predetermined range, are momentarily fallen from a surface of the table when the table reciprocates; and a fine particle removing unit configured to remove fine particles irrelevant to the filler in the material having the smaller gravity sucked through the suction unit.

17. The apparatus of claim 1, wherein the filler is sorted into two or more materials, and the two or more materials include silica and an elastic body.

\* \* \* \* \*